US010099298B2

(12) United States Patent
Son et al.

(10) Patent No.: US 10,099,298 B2
(45) Date of Patent: Oct. 16, 2018

(54) CUTTING INSERT AND INDEXABLE DRILL

(71) Applicant: KORLOY INC, Seoul (KR)

(72) Inventors: Hong Seung Son, Cheongju-si (KR);
Chan Kyu Park, Cheongju-si (KR);
Hyo Joon Lim, Cheongju-si (KR);
Sung Hyun Kim, Cheongju-si (KR);
Sun Yong Ahn, Cheongju-si (KR);
Young Heum Kim, Cheongju-si (KR)

(73) Assignee: KORLOY INC, Seoul (KR)

( * ) Notice: Subject to any disclaimer, the term of this patent is extended or adjusted under 35 U.S.C. 154(b) by 219 days.

(21) Appl. No.: 15/031,764

(22) PCT Filed: Sep. 2, 2014

(86) PCT No.: PCT/KR2014/008173
§ 371 (c)(1),
(2) Date: Apr. 25, 2016

(87) PCT Pub. No.: WO2015/064907
PCT Pub. Date: May 7, 2015

(65) Prior Publication Data
US 2016/0263664 A1 Sep. 15, 2016

(30) Foreign Application Priority Data
Oct. 29, 2013 (KR) .................. 10-2013-0129076

(51) Int. Cl.
B23B 51/02 (2006.01)
B23B 51/06 (2006.01)

(52) U.S. Cl.
CPC .............. B23B 51/02 (2013.01); B23B 51/06 (2013.01); B23B 2250/12 (2013.01);
(Continued)

(58) Field of Classification Search
CPC . B23B 51/02; B23B 2205/02; B23B 2251/02; Y10T 408/9098; Y10T 408/90987
See application file for complete search history.

(56) References Cited

U.S. PATENT DOCUMENTS 5,387,059 A * 2/1995 Borzemsky .............. A61C 3/02
408/226
5,957,631 A * 9/1999 Hecht ..................... B23B 51/00
408/144

(Continued)

FOREIGN PATENT DOCUMENTS

JP 2005517539 A 6/2005
KR 100656265 B1 5/2006
(Continued)

OTHER PUBLICATIONS

International Search Report dated Dec. 9, 2014 issued in PCT/KR2014/008173.

Primary Examiner — Eric A Gates
(74) Attorney, Agent, or Firm — Scully Scott Murphy & Presser

(57) ABSTRACT

The present disclosure relates to a cutting insert and an indexable drill. The cutting insert and the indexable drill according to the present disclosure are configured such that when the cutting insert is mounted on the indexable drill, the cutting insert is easily inserted into the indexable drill at the initial time, and strong coupling force is implemented between the indexable drill and the cutting insert at a point of time at which the cutting insert is completely mounted. In addition, the cutting insert, according to the present disclosure, has excellent rigidity, when compared to cutting inserts in the related art that perform identical/similar cutting processing, since a portion, which is weak in rigidity, is provided as a thick portion.

19 Claims, 12 Drawing Sheets

(52) U.S. Cl.
CPC ....... *B23B 2251/02* (2013.01); *B23B 2251/50* (2013.01); *Y10T 408/45* (2015.01); *Y10T 408/90987* (2015.01)

(56) References Cited

U.S. PATENT DOCUMENTS

| | | | | |
|---|---|---|---|---|
| 6,840,717 B2* | 1/2005 | Eriksson | ................. | B23B 51/02 408/1 R |
| 7,407,350 B2* | 8/2008 | Hecht | ..................... | B23B 51/02 407/34 |
| 7,625,161 B1* | 12/2009 | Ruy Frota de Souza | ................... | B23B 51/02 407/113 |
| 7,972,094 B2* | 7/2011 | Men | ........................ | B23B 51/02 408/226 |
| 8,142,116 B2* | 3/2012 | Frejd | ....................... | B23B 51/02 408/226 |
| 8,430,609 B2* | 4/2013 | Frejd | ....................... | B23B 51/02 408/226 |
| 8,721,235 B2* | 5/2014 | Kretzschmann | ........ | B23B 51/02 408/144 |
| 8,784,018 B2* | 7/2014 | Pabel | ..................... | B23B 51/02 408/230 |
| 8,784,019 B2* | 7/2014 | Pabel | ..................... | B23B 51/02 408/227 |
| 8,840,347 B2* | 9/2014 | Aare | ....................... | B23B 51/02 408/230 |
| 8,931,982 B2* | 1/2015 | Osawa | ................... | B23B 51/02 408/226 |
| 8,992,143 B2* | 3/2015 | Glimpel | ................. | B23B 51/02 408/226 |
| 9,296,049 B2* | 3/2016 | Schwaegerl | ............ | B23B 51/00 |
| 9,555,484 B2* | 1/2017 | Koga | ..................... | B23B 51/02 |
| 2009/0116920 A1* | 5/2009 | Bae | ........................ | B23B 51/02 408/227 |
| 2010/0322728 A1* | 12/2010 | Aare | ....................... | B23B 51/02 408/200 |
| 2011/0318128 A1* | 12/2011 | Schwagerl | ............. | B23B 51/02 408/200 |
| 2012/0315101 A1* | 12/2012 | Osawa | ................... | B23B 51/02 408/226 |

FOREIGN PATENT DOCUMENTS

| | | |
|---|---|---|
| KR | 100649359 B1 | 11/2006 |
| KR | 100767730 B1 | 10/2007 |
| KR | 20100138801 A | 12/2010 |
| KR | 20100138803 A | 12/2010 |
| WO | WO 2008014367 A1 * | 1/2008 ............. B23B 51/02 |

* cited by examiner

COMPARATIVE EXAMPLE | EXEMPLARY EMBODIMENT (a)

(d)

(b)

(e)

(c)

(f)

(a)

(b)

| COMPARATIVE EXAMPLE | EXEMPLARY EMBODIMENT |
|---|---|
| (a)  | (c)  |
| (b)  | (d)  |

CUTTING INSERT AND INDEXABLE DRILL

TECHNICAL FIELD

The present disclosure relates to a cutting insert and an indexable drill, and more particularly, to a cutting insert, which is installed on an indexable drill so that the indexable drill is used to machine a hole, and an indexable drill.

BACKGROUND ART

In general, an indexable drill is configured so that a cutting insert may be replaceably mounted on the indexable drill. Thus, when a cutting insert is abraded, a new cutting insert is replaced and used.

As a means for fixing the cutting insert to the indexable drill, a bolt has been used to mount the cutting insert on the indexable drill. However, recently, technologies are being developed so that the cutting insert is autonomously fixed to the indexable drill without using a bolt.

A type in which the cutting insert is fixed to the indexable drill without using a fastening element such as a separate bolt or screw as described above is known as a self-fixing type.

The self-fixing type indexable drill in the related art uses elasticity and frictional force of metal or implements coupling force. In addition, in the case of the self-fixing type indexable drill, concave-convex portions are formed at portions where the cutting insert and the indexable drill are coupled to each other, such that the cutting insert and the indexable drill are coupled to each other as the concave-convex portions are engaged with each other.

However, because a drill tool rotates at a high speed, the cutting insert is required to maintain secure coupling force without being loosened in the indexable drill, during a process of machining a hole.

In a case in which coupling force between the indexable drill and the cutting insert becomes excessively higher, it is difficult to mount or separate the cutting insert.

Therefore, an indexable drill is required to implement coupling force appropriate for fixing the cutting insert and easily separate or mount the cutting insert.

On the other hand, since the cutting insert is a constituent element that performs cutting processing, such that the cutting insert is required to have high rigidity, the cutting insert is manufactured by using an expensive material. In addition, the material is subjected to grinding processing in order to implement a desired shape of the cutting insert, and in this case, it is possible to reduce costs of the cutting insert by reducing parts to be ground and eliminated.

However, a method of manufacturing the cutting insert, which has been known in the related art, has a problem in that a material in the form of a round bar is ground, such that a large number of parts are disposed of, which causes serious material waste.

LITERATURE OF RELATED ART

Patent Literature

Korean Patent No. 10-0649359 (Nov. 17, 2006)
Korean Patent No. 10-0656265 (Dec. 5, 2006)

DISCLOSURE

Technical Problem

Accordingly, an object of the present disclosure is to provide a cutting insert and an indexable drill, which may be easily handled when the cutting insert is mounted on or separated from the indexable drill, and may improve coupling force by which the cutting insert is fixed to the indexable drill.

Technical problems to be solved by the present disclosure are not limited to the aforementioned technical problem, and other technical problems, which are not mentioned above, may be clearly understood from the following descriptions by those skilled in the art to which the present disclosure pertains.

Technical Solution

To achieve the above object, a cutting insert according to an exemplary embodiment of the present disclosure includes: an insert body 110; a post 120 which is formed at a lower side of the insert body 110 and has a first central axis cp; a fastening surface 130 which is formed at a lateral side of the insert body 110; a pressure receiving surface 140 which is formed on the insert body 110 in a direction orthogonal to the fastening surface 130; a tip cutting edge 150 which is formed at a tip portion of the insert body 110 and subjected to cutting processing; a lateral cutting edge 152 which is formed at a lateral side of the insert body 110 and subjected to a cutting processing; and an insert flute 154 which is formed at one side of the lateral cutting edge 152 of the insert body 110 and guides a discharge of cutting chips, in which the fastening surface 130 is provided as a surface of a cylindrical shape in which an upper radius r1 and a lower radius r2 are equal to each other, and a second central axis cs of the cylinder has a gradient with respect to the first central axis cp when viewed from a lateral side, and the second central axis cs is eccentric and has a gradient when viewed from a top side.

In the fastening surface 130 of the cutting insert according to the exemplary embodiment of the present disclosure, when a first angle a1 which is formed between the first central axis cp and a surface of the fastening surface 130 is defined in a cross section that runs through the first central axis cp and an initial portion 131 of the fastening surface 130, and a third angle a3 which is formed between the first central axis cp and a surface of the fastening surface 130 is defined in a cross section that runs through the first central axis cp and a final portion 133 of the fastening surface 130, the first angle a1 may be greater than the third angle a3.

In the fastening surface 130 of the cutting insert according to the present disclosure, when a reference line L is presented at a particular height, and a first distance b1 along the reference line L from a surface of an initial portion 131 of the fastening surface 130 to the first central axis cp, and a third distance b3 along the reference line L from a surface of a final portion 133 of the fastening surface 130 to the first central axis cp are defined, the first distance b1 may be smaller than the third distance b3.

In the fastening surface 130 of the cutting insert according to the present disclosure, when a fourth angle d1 which is formed between the first central axis cp and a surface of the fastening surface 130 is defined in a cross section that runs through the first central axis cp and an initial portion 131 of the fastening surface 130, and a sixth angle d3 which is formed between the first central axis cp and a surface of the fastening surface 130 is defined in a cross section that is in parallel with a first cross section and runs through a final portion 133 of the fastening surface 130 may be defined, the fourth angle d1 and the sixth angle d3 may be equal to each other.

In addition, in the fastening surface 130 of the cutting insert according to the present disclosure, fourth and sixth distances e1 and e3 from the first central axis cp to an initial portion 131 of the fastening surface 130 may be smaller than fifth and seventh distances e2 and e4 from the first central axis cp to a final portion 133 of the fastening surface 130 when viewed from a plan cross section that runs through the fastening surface 130.

In addition, a wrench groove 160 into which a wrench tool is mounted may be further formed at a lateral side of the insert body 110 of the cutting insert according to the present disclosure, and the wrench groove 160 may be formed to be inclined in a direction identical to a direction of a gradient of the lateral cutting edge 152 when viewed from a lateral side of the insert body 110.

In addition, a curved surface grinding reference surface 114, which has a radius smaller than an outer diameter of the insert body 110 and is concentric with the first central axis cp, may be formed at a lower side of the insert body 110 of the cutting insert according to the present disclosure, and the curved surface grinding reference surface 114 may be clamped by a grinding machine when the cutting insert is mounted on the grinding machine and subjected to grinding processing.

In addition, a flat surface grinding reference surface 116 having a flat shape may be further formed on the curved surface grinding reference surface 114 of the cutting insert according to the present disclosure, and the flat surface grinding reference surface 116 may be used to manage a dimension of the cutting insert.

In addition, the pressure receiving surface 140 of the cutting insert according to the present disclosure may be formed to be inclined so that a portion, which is directed toward the tip cutting edge 150, is wider with respect to the first central axis cp when viewed from a lateral side of the cutting insert in a direction orthogonal to the pressure receiving surface 140.

To achieve the above object, an indexable drill according to the exemplary embodiment of the present disclosure includes: a holder body 210; a body flute 220 which is formed in an outer circumferential surface of the holder body 210 and guides a discharge of cutting chips; a seat 250 which is formed at a tip portion of the holder body 210 and on which a cutting insert 100 is placed; a center boss 240 which is formed on the seat 250 and guides the rotation of the cutting insert 100 when the cutting insert 100 is mounted; and twin fingers 260 which are formed on the seats 250 in the form of two branches, have a holder fastening surface 262 that is formed on an inner circumferential surface thereof so as to be concentric with a third central axis cb of the center boss 240, and have a pressing surface 264 that is formed at a lateral side so as to press the cutting insert 100, and the cutting insert 100 is the cutting insert according to any one of claims 1 to 9.

In addition, the indexable drill according to the exemplary embodiment of the present disclosure may further include an oil hole 230 which is formed in the holder body 210, and allows cutting oil to be discharged to the cutting insert 100 and a portion which is subjected to the cutting processing.

In addition, the pressing surface 264 of the indexable drill according to the exemplary embodiment of the present disclosure may be formed to be inclined when viewed from a lateral side of the holder body 210 in a direction orthogonal to the pressing surface 264 so that a portion of the pressing surface 264, which is directed toward a tip portion of the twin finger 260, is wider with respect to the third central axis cb.

In addition, in the indexable drill according to the exemplary embodiment of the present disclosure, a post 120 of the cutting insert 100 may be loosely assembled to the center boss 240.

In addition, in the indexable drill according to the exemplary embodiment of the present disclosure, a guide protrusion 270 may be further formed on the seat 250 so as to guide the rotation of the cutting insert 100 when the cutting insert 100 is mounted on or separated from the holder body 210.

Other detailed matters of the exemplary embodiment are included in the detailed description and the drawings.

Advantageous Effects

According to the cutting insert and the indexable drill according to the exemplary embodiment of the present disclosure, which is configured as described above, when the cutting insert is mounted on the indexable drill, the cutting insert is fitted with the indexable drill in a central axis direction and then rotated clockwise so as to be mounted on the indexable drill, and in this case, the cutting insert is easily rotated at the initial time, and coupling force is increased at a point of time at which the rotation of the cutting insert is completed. Therefore, the cutting insert and the indexable drill according to the exemplary embodiment of the present disclosure may be easily handled, and high coupling force may be implemented.

In addition, according to the cutting insert and the indexable drill according to the exemplary embodiment of the present disclosure, when a material for the cutting insert is mounted on a grinding processing machine and subjected to grinding processing, the material may be easily held by the curved surface grinding reference surface and the flat surface grinding reference surface formed on the cutting insert, thereby minimizing a part which is to be grounded and eliminated. Therefore, it is possible to minimize material waste.

In addition, according to the cutting insert and the indexable drill according to the exemplary embodiment of the present disclosure, a wrench is used to mount or separate the cutting insert on or from the indexable drill, and in a case in which a cutting edge of the cutting insert is seriously abraded, the cutting insert is reground and reused. In this case, the wrench groove to accommodate the wrench is formed to be inclined in a direction similar to the lateral cutting edge, and as a result, it is possible to maintain rigidity of the cutting insert even though the cutting insert is reused.

Figure 1:
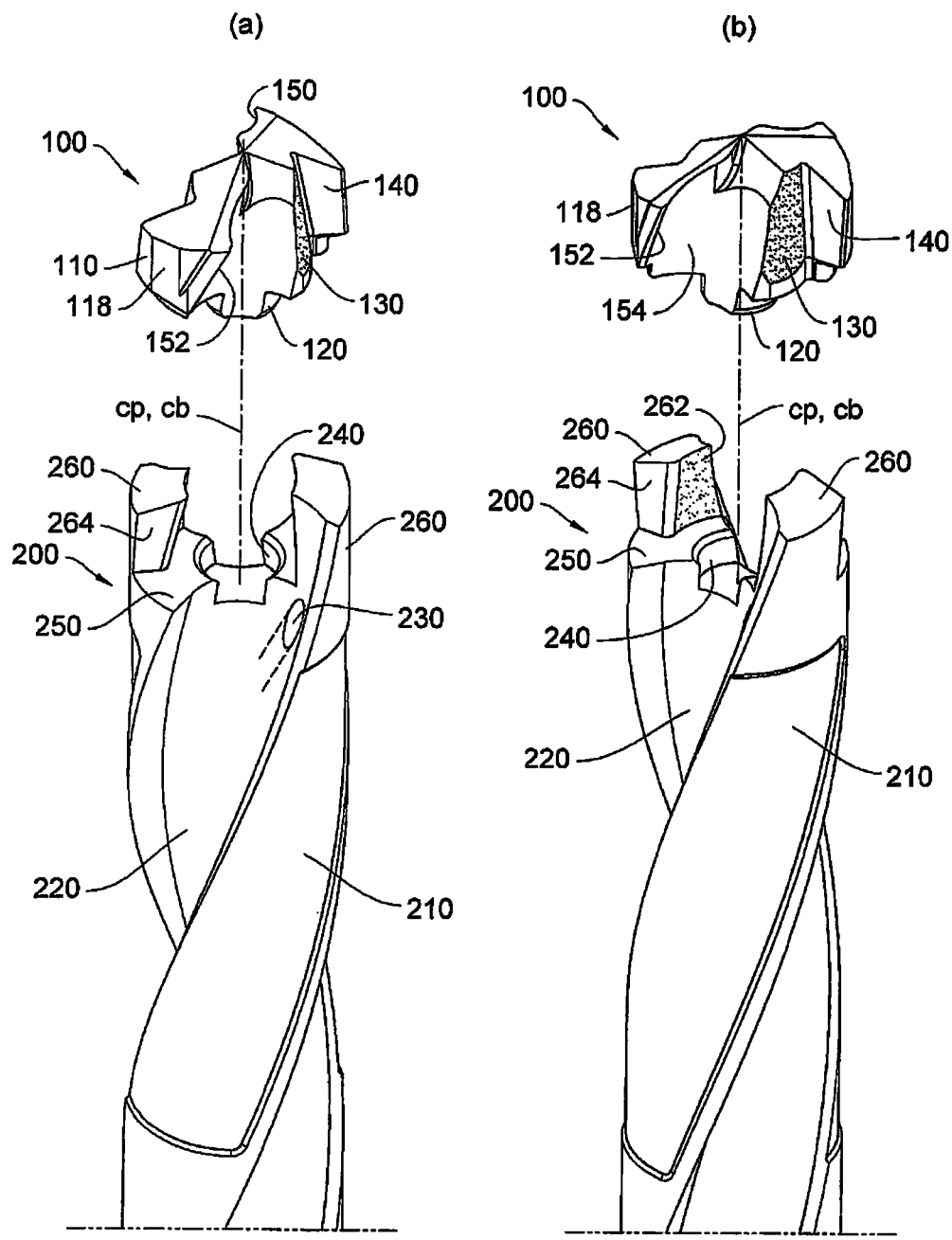
FIG. 1 a view for explaining a cutting insert and an indexable drill according to an exemplary embodiment of the present disclosure.
Figure 2:
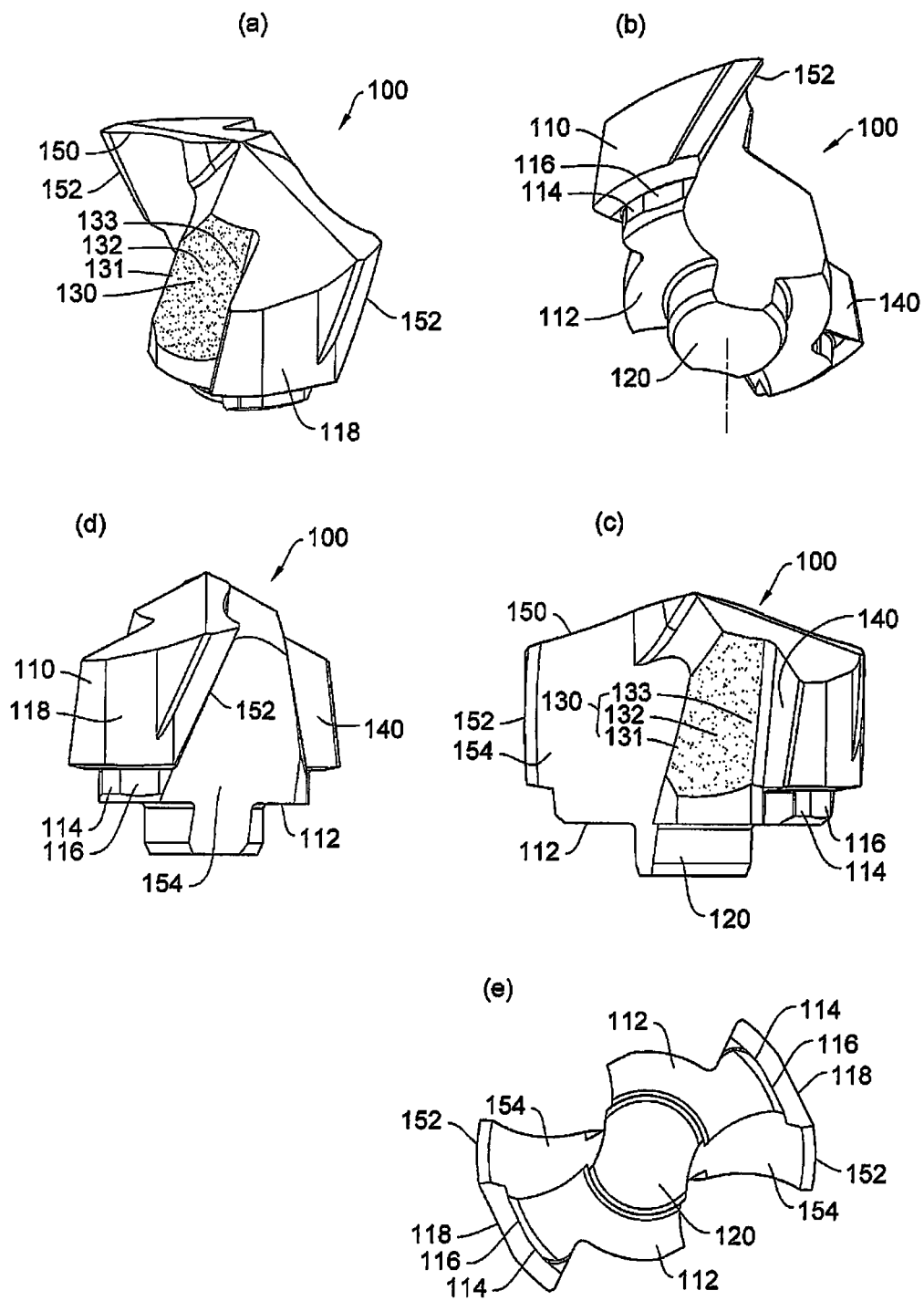
FIGS. 2 to 7 are views for explaining one example of the cutting insert according to the exemplary embodiment of the present disclosure.
Figure 3:
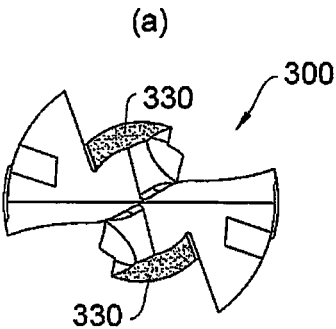
Figure 3:
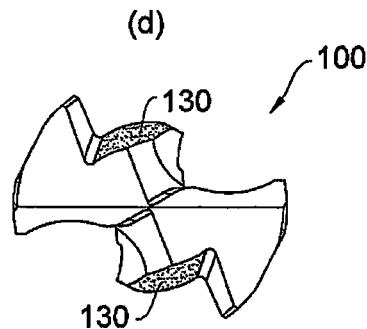
Figure 3:
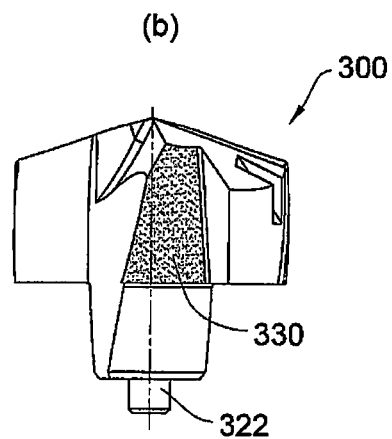
Figure 3:
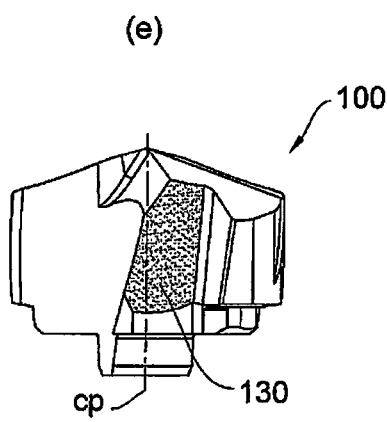
Figure 3:
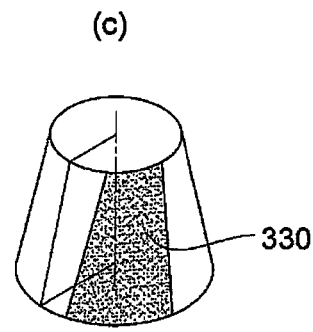
Figure 3:
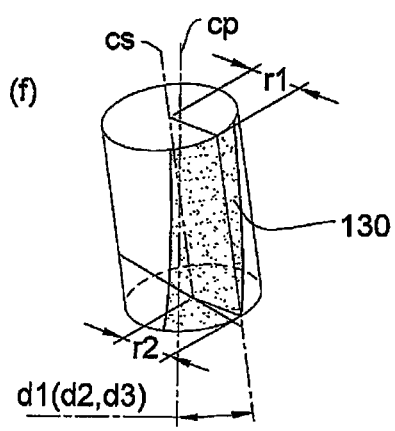

DESCRIPTION OF MAIN REFERENCE
NUMERALS OF DRAWINGS

100: Cutting insert
110: Insert body
112: Seating surface
114: Curved surface grinding reference surface
116: Flat surface grinding reference surface
118: Clamping surface
120: Post
130: Fastening surface
131: Initial portion
132: Intermediate portion
133: Final portion
140: Pressure receiving surface
150: Tip cutting edge
152: Lateral cutting edge
154: Insert flute
160: Wrench groove
200: Holder
210: Holder body
220: Body flute
230: Oil hole
240: Center boss
250: Seat
260: Twin finger
262: Holder fastening surface
264: Pressing surface
270: Guide protrusion
272: Guide surface
300: Cutting insert
320: To-be-eliminated material
330: Fastening surface
340: Pressure receiving surface
352: Lateral cutting edge
360: Wrench groove
B: Reference surface for illustration in drawing

BEST MODE

Advantages and features of the present disclosure and methods of achieving the advantages and features will be clear with reference to exemplary embodiments described in detail below together with the accompanying drawings.

Hereinafter, an exemplary embodiment of the present disclosure will be described in detail with reference to the accompanying drawings. It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

Meanwhile, the terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

Hereinafter, an indexable drill according to an exemplary embodiment of the present disclosure will be described with reference to FIG. 1. The attached FIG. 1 is a view for explaining the indexable drill according to the exemplary embodiment of the present disclosure.

The indexable drill according to the exemplary embodiment of the present disclosure has a configuration in which a cutting insert 100 is assembled to a holder 200.

In more detail, when the cutting insert 100 is mounted on the holder 200, the cutting insert 100 is inserted into a holder 200 in an axial direction, and then the cutting insert 100 is rotated and mounted when the holder 200 is in a stationary state, and coupling force is implemented between the holder 200 and the cutting insert 100 in a state in which the cutting insert 100 is mounted.

The coupling force is implemented as a fastening surface 130 formed on the cutting insert 100 comes into close contact with a holder fastening surface 262 formed on the holder 200.

Hereinafter, the cutting insert according to the exemplary embodiment of the present disclosure will be described with reference to FIGS. 2 to 7. The attached FIGS. 2 to 7 are views for explaining one example of the cutting insert according to the exemplary embodiment of the present disclosure.

The cutting insert 100 according to the exemplary embodiment of the present disclosure has a post 120 formed at a lower side of an insert body 110. A central axis of the post 120 is defined as a first central axis cp.

The fastening surface 130 is formed at a lateral side of the insert body 110. In addition, a pressure receiving surface 140 is formed in a direction orthogonal to the fastening surface 130 of the insert body 110.

A tip cutting edge 150 is formed at a tip portion of the insert body 110, and a lateral cutting edge 152 is formed at a lateral side of the insert body 110. The tip cutting edge 150 performs cutting processing in a depth direction of a hole at the time of machining the hole. The lateral cutting edge 152 performs a cutting processing on an inner circumferential surface of a hole at the time of machining the hole.

In addition, an insert flute 154 is formed at one side of the lateral cutting edge 152 of the insert body 110, and the insert flute 154 guides a discharge of cutting chips produced during the cutting processing.

Meanwhile, the fastening surface 130 may be described as a cylinder shape that is a geometrical figure. In detail, as illustrated in FIG. 3F, the cylinder may have a straight shape in which an upper radius r1 and a lower radius r2 are equal to each other, and a part of the surface of the cylinder shape may be understood as a shape of the fastening surface 130.

A second central axis cs of the cylinder has a gradient with respect to the first central axis cp of the post 120 when viewed from the lateral side of the cylinder, and the second central axis cs is eccentric and has a gradient when viewed from the top side of the cylinder. That is, the first central axis cp and the second central axis cs do not intersect and are not parallel in a three-dimensional space, and an upper side of the cylinder is inclined toward the first central axis cp of the cutting insert 100.

In contrast, in the case of a cutting insert 300 according to a Comparative Example, a fastening surface 330 may be understood as a part of a surface of a conical shape when describing the fastening surface 330 as a geometrical figure. Further, a center axis of the conical shape is identical to a central axis of a post 322.

That is, the cutting insert 300 according to the Comparative Example has a particular apex at a surface of the fastening surface 330, and a distance between the apex and the central axis is not changed when the cutting insert 300 is rotated about the central axis. This means that no dynamic relationship occurs between the cutting insert 300 and twin fingers of the holder, which interact with the fastening surface 330, when the cutting insert 300 rotates.

However, the cutting insert 100 according to the exemplary embodiment of the present disclosure has a dynamic relationship with twin fingers 260 of the holder 200 in accordance with a position of an apex of the fastening surface 130.

First, referring to FIG. 4, a configuration of the fastening surface 130 will be described with reference to cross sections of the fastening surface 130 which run through the first central axis cp.

FIG. 4A is a top plan view of the cutting insert 100 according to the exemplary embodiment of the present disclosure. The arrow B illustrated in FIG. 4A indicates a reference so that the pressure receiving surface 140 is disposed in a vertical direction when viewing the cutting insert 100 in a top plan view. That is, the arrow B is presented to clearly define an X-axis and a Y-axis in FIG. 4A. In the following description, an X-axis and a Y-axis mean the X-axis and the Y-axis illustrated in FIG. 4A.

Meanwhile, FIGS. 4B, 4C, and 4D are cross-sectional views taken along lines A1-A1, A2-A2, and A3-A3 illustrated in FIG. 4A. In more detail, FIG. 4B is a cross-sectional view of an initial portion 131 which initially comes into contact with the twin finger 260 when the fastening surface 130 is mounted on the twin finger 260. FIG. 4D is a cross-sectional view of a final portion 133 which finally comes into contact with the twin finger 260 when the fastening surface 130 is completely mounted on the twin finger 260. FIG. 4C is a cross-sectional view illustrating an intermediate portion 132 between the initial portion 131 and the final portion 133.

To help understand the configuration of the fastening surface 130, a first angle a1, a second angle a2, and a third angle a3 are defined as follows.

The first angle a1 is an angle formed between the first central axis cp and the surface of the fastening surface 130 in a cross section which runs through the first central axis cp and the initial portion 131 of the fastening surface 130.

The second angle a2 is an angle formed between the first central axis cp and the surface of the fastening surface 130 in a cross section which runs through the first central axis cp and the intermediate portion 132 of the fastening surface 130.

The third angle a3 is an angle formed between the first central axis cp and the surface of the fastening surface 130 in a cross section which runs through the first central axis cp and the final portion 133 of the fastening surface 130.

The fastening surface 130 according to the exemplary embodiment of the present disclosure is configured so that the first angle a1 is greater than the third angle a3. In addition, the second angle a2 is greater than the first angle a1, and smaller than the third angle a3.

Figure 4:
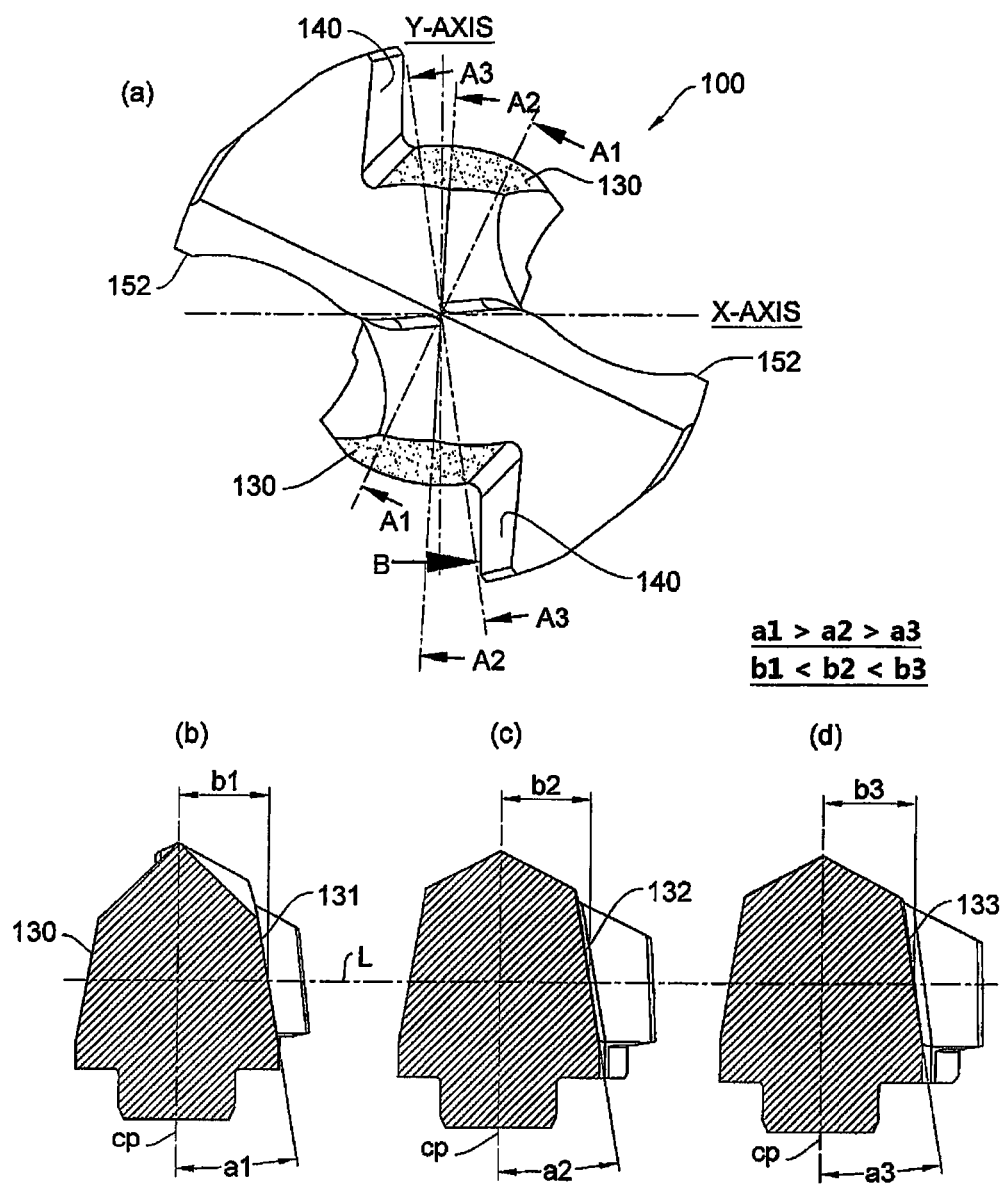

On the other hand, the fastening surface 130 according to the exemplary embodiment of the present disclosure has characteristics as illustrated in FIG. 4. L illustrated in FIGS. 4B, 4C, and 4D is a reference line, and the reference line L indicates the same height in the respective cross-sectional views.

In the case of the fastening surface 130 according to the exemplary embodiment of the present disclosure, when the reference line L is presented as a particular height as described above, a first distance b1, a second distance b2, and a third distance b3 may be defined.

The first distance b1 is the shortest distance along the reference line L from the surface of the initial portion 131 of the fastening surface 130 to the first central axis cp.

The second distance b2 is the shortest distance along the reference line L from the surface of the intermediate portion 132 of the fastening surface 130 to the first central axis cp.

The third distance b3 is the shortest distance along the reference line L from the surface of the final portion 133 of the fastening surface 130 to the first central axis cp.

In the case of the fastening surface 130 according to the exemplary embodiment of the present disclosure, the first distance b1 is shorter than the third distance b3. The second distance b2 is longer than the first distance, and shorter than the third distance b3.

Figure 5:
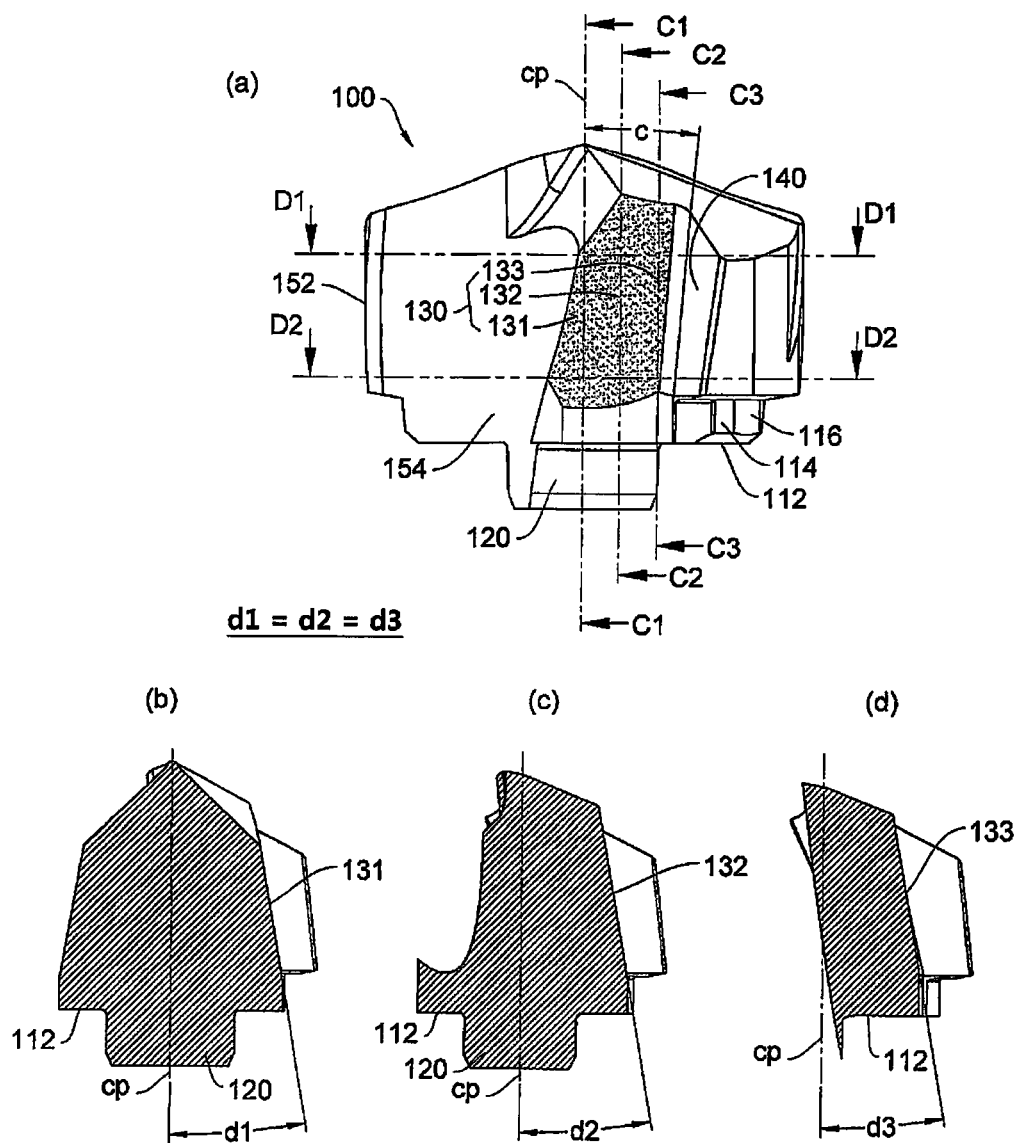

On the other hand, the fastening surface 130 according to the exemplary embodiment of the present disclosure has characteristics as illustrated in FIG. 5. FIG. 5A is a front view of the cutting insert 100. FIGS. 5B, 5C, and 5D are cross-sectional views taken along lines C1-C1, C2-C2, and C3-C3 illustrated in FIG. 5. In more detail, FIG. 5B is a cross-sectional view of the initial portion 131 which initially comes into contact with the twin finger 260 when the fastening surface 130 is mounted on the twin finger 260. FIG. 5D is a cross-sectional view of the final portion 133 which finally comes into contact with the twin finger 260 when the fastening surface 130 is completely mounted on the twin finger 260. FIG. 5C is a cross-sectional view illustrating the intermediate portion 132 between the initial portion 131 and the final portion 133.

To help understand the configuration of the fastening surface 130, a fourth angle d1, a fifth angle d2, and a sixth angle d3 are defined as follows.

The fourth angle d1 is an angle formed between the first central axis cp and the surface of the fastening surface 130 in a cross section which runs through the first central axis cp and the initial portion 131 of the fastening surface 130.

The fifth angle d2 is an angle formed between the first central axis cp and the surface of the fastening surface 130 in a cross section which is in parallel with a first cross section and runs through the intermediate portion 132 of the fastening surface 130.

The sixth angle d3 is an angle formed between the first central axis cp and the surface of the fastening surface 130 in a cross section which is in parallel with the first cross section and runs through the final portion 133 of the fastening surface 130.

The fastening surface 130 according to the exemplary embodiment of the present disclosure is configured so that the fourth angle d1 may be equal to the sixth angle d3. In addition, the fifth angle d2 may be equal to the fourth angle d1.

Figure 6:
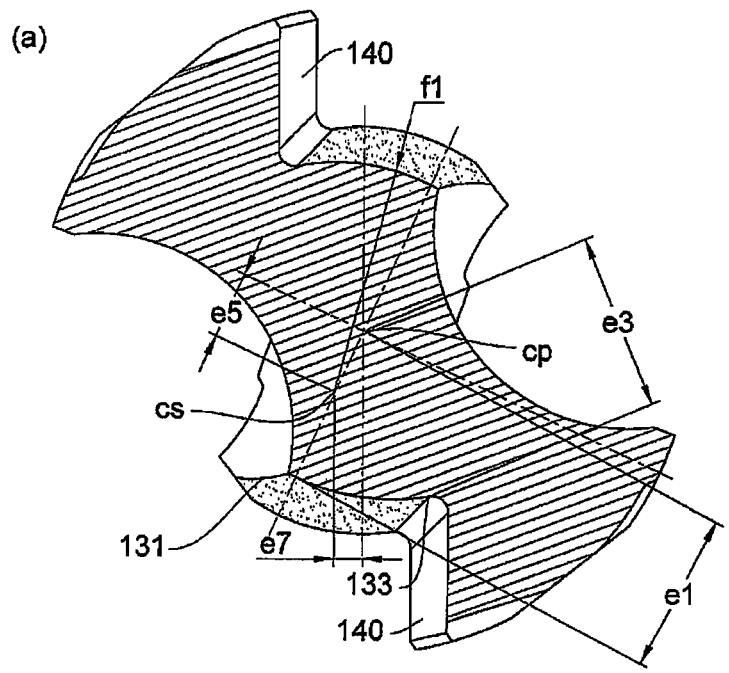
Figure 6:
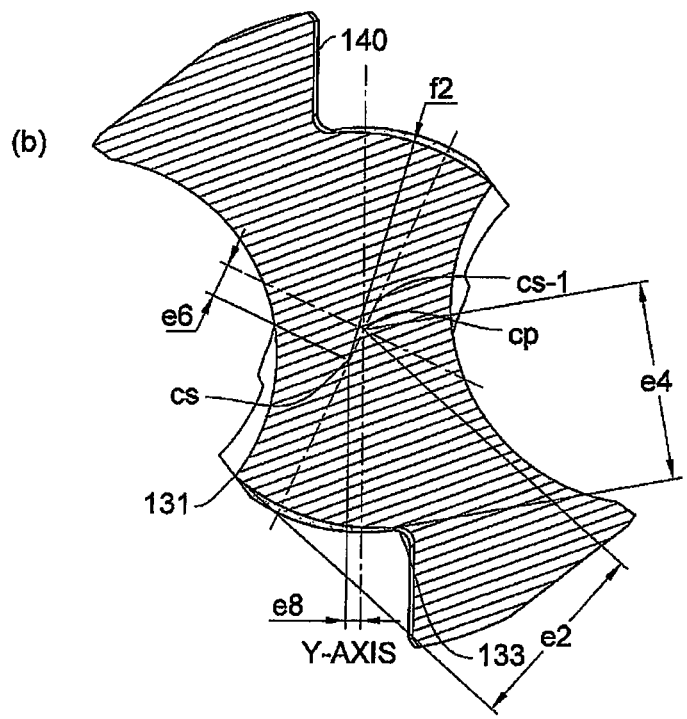

On the other hand, the fastening surface 130 according to the exemplary embodiment of the present disclosure has characteristics as illustrated in FIG. 6. FIG. 6A is a cross-sectional view taken along line D1-D1 illustrated in FIG. 5A, and FIG. 6B is a cross-sectional view taken along line D2-D2 illustrated in FIG. 5A. In more detail, FIG. 6A is a cross-sectional plan view of a portion adjacent to the tip portion of the cutting insert 100, and FIG. 6B is a cross-sectional plan view of a portion adjacent to a seating surface 112 of the cutting insert 100.

To help understand the configuration of the fastening surface 130, a fourth distance e1, a fifth distance e2, a sixth distance e3, a seventh distance e4, an eighth distance e5, and a ninth distance e6 are defined as follows.

The fourth distance e1 is the shortest distance from the first central axis cp to the surface of the initial portion 131 in a plan cross section of a portion adjacent to the tip portion of the cutting insert 100.

The fifth distance e2 is the shortest distance from the first central axis cp to the surface of the initial portion 131 in a plan cross section of a portion adjacent to the seating surface 112 of the cutting insert 100.

The sixth distance e3 is the shortest distance from the first central axis cp to the surface of the final portion 133 in a plan cross section of a portion adjacent to the tip portion of the cutting insert 100.

The seventh distance e4 is the shortest distance from the first central axis cp to the surface of the final portion 133 in a plan cross-section of a portion adjacent to the seating surface 112 of the cutting insert 100.

The eighth distance e5 is the shortest distance from the first central axis cp to a curvature center cs of the fastening surface 130 in a plan cross section adjacent to the tip portion of the cutting insert 100.

The ninth distance e6 is the shortest distance from the first central axis cp to the curvature center cs of the fastening surface 130 in a plan cross section of a portion adjacent to the seating surface 112 of the cutting insert 100.

As illustrated in FIG. 6, it can be seen that the fourth distance e1 is shorter than the corresponding fifth distance e2. In addition, it can be seen that the sixth distance e3 is shorter than the corresponding seventh distance e4. That is, the fourth and sixth distances e1 and e3 from the first central axis cp to the initial portion 131 of the fastening surface 130 are shorter than the fifth and seventh distances e2 and e4 from the first central axis cp to the final portion 133 of the fastening surface 130.

Meanwhile, as illustrated in FIG. 6, it can be seen that the eighth distance e5 is longer than the corresponding ninth distance e6. In addition, a central axis CS of the fastening surface 130 is greatly deflected at the tip portion by a tenth distance e7 even when viewed based on the Y-axis, but the central axis CS of the fastening surface 130 is deflected at a portion adjacent to the seating surface 112 by an eleventh distance e8 relatively less than the tenth distance e7. Therefore, it can be seen that the central axis cs of the fastening surface 130 is inclined.

On the other hand, in the case of the cutting insert 100 according to the exemplary embodiment of the present disclosure, a first curvature f1 of the fastening surface 130 in a cross-sectional plan view of a portion adjacent to the tip portion may be equal or similar to a second curvature f2 of the fastening surface 130 in a cross-sectional plan view of a portion adjacent to the seating surface 112. That is, the same curvature of the same fastening surface 130 is maintained when viewing the cutting insert 100 in a plan view at any height of the fastening surface 130.

Figure 7:
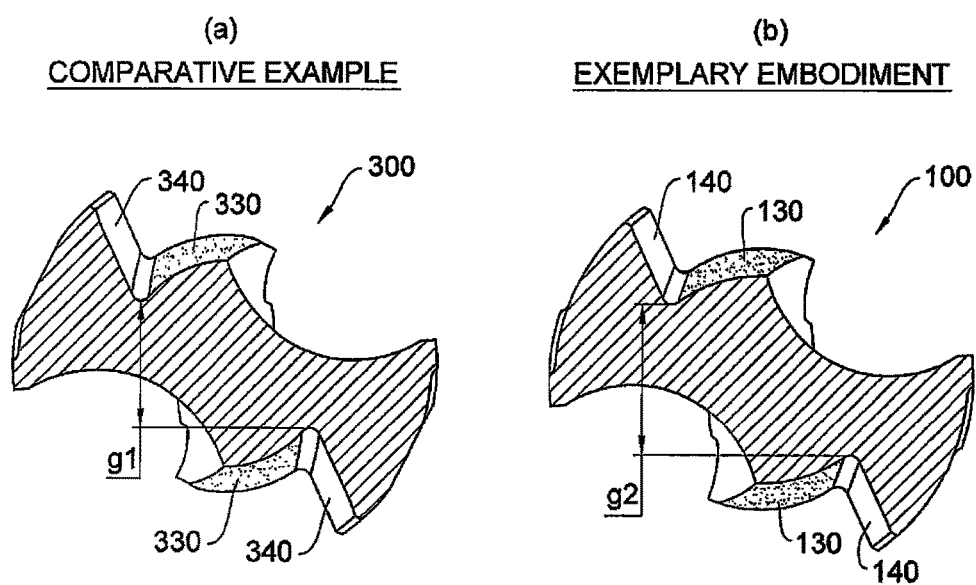

In the case of the cutting insert 100 according to the exemplary embodiment of the present disclosure which is configured as described above, a portion, which is pointed out as being weak in rigidity, may be formed to be thick as illustrated in FIG. 7.

The attached FIG. 7A is a Comparative Example, and FIG. 7B is a view illustrating one exemplary embodiment of the present disclosure.

In more detail, the Comparative Example represents that the fastening surface 330 has a conical surface, and the curvature center of the fastening surface 330 coincides with a center of the post, that is, the central axis of the cutting insert 300.

The portion, which is weakest in rigidity, may be a portion where a width is narrow, or an external shape is steeply changed. It is known that the cutting insert 100 is weakest in rigidity at a boundary portion between the fastening surface 130 and the pressure receiving surface 140.

In FIG. 7A, the portion, which is weak in rigidity, may be understood as a first thickness g1. In FIG. 7B, the corresponding portion may be understood as a second thickness g2. Meanwhile, FIG. 7 is a view illustrating comparison according to the specification in which outer diameters of the lateral cutting edges are equal so as to implement the same cutting performance.

That is, as illustrated in FIG. 7, it can be seen that the second thickness g2 of the cutting insert 100 according to the exemplary embodiment of the present disclosure is formed to be thicker than the first thickness g1 according to the Comparative Example. Therefore, the portion, which is weak in rigidity, may be formed as a thick portion, and the weak portion is formed to have a great thickness, thereby improving rigidity.

Figure 8:
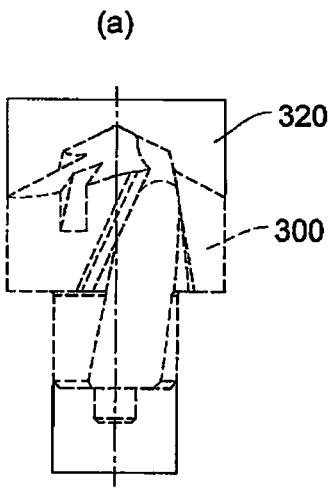
FIG. 8 is a view for explaining another example of the cutting insert according to the exemplary embodiment of the present disclosure.
Figure 8:
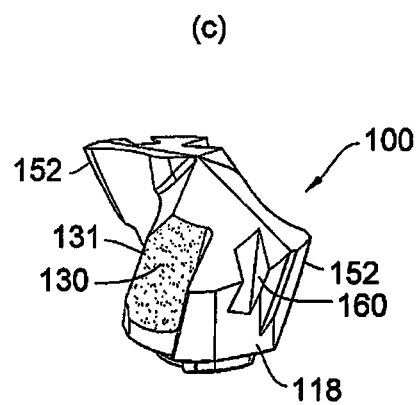
Figure 8:
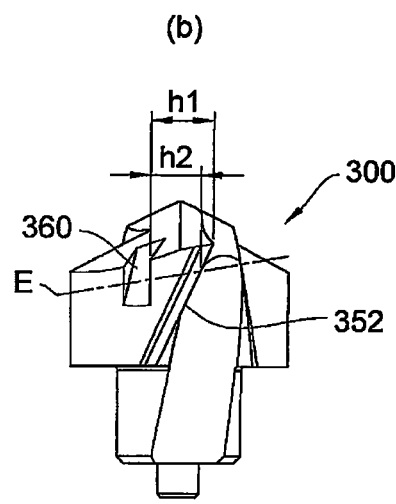
Figure 8:
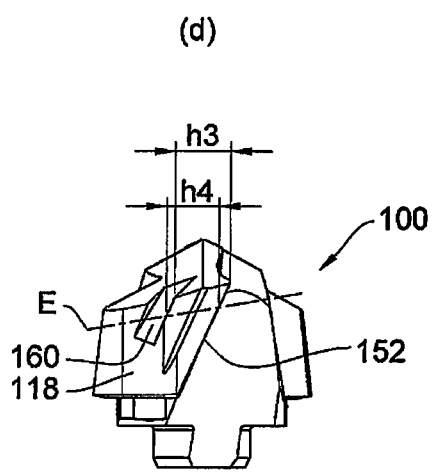

Hereinafter, another example of the cutting insert will be described with reference to FIG. 8. The attached FIG. 8 is a view for explaining another example of a cutting insert according to another exemplary embodiment of the present disclosure.

The cutting insert 300 according to the Comparative Example is manufactured by performing the cutting processing on the material which has a greater external shape than the cutting insert 300. The material of the cutting insert 300 according to the Comparative Example may have a cylindrical shape. Therefore, there is a problem in that a to-be-eliminated material 320, which will be eliminated, is very large, which causes serious material waste.

In addition, since the cutting insert 300 according to the Comparative Example is manufactured by performing the cutting processing, a size of the post, which allows the material to be held, needs to be great, and as a result, there is a problem in that a size of the cutting insert is increased.

In contrast, the cutting insert 100 according to the exemplary embodiment of the present disclosure is manufactured by sintering, and grinding processing is carried out in a greatly restrictive manner, such that a portion required for clamping may be formed to be small compared to the Comparative Example, thereby reducing costs of the material.

On the other hand, the cutting insert 100 according to the exemplary embodiment of the present disclosure may further have a wrench groove 160 formed at a lateral side of the insert body 110. In more detail, a clamping surface 118 may be formed to be flat at the lateral side of the insert body 110. The clamping surface 118 may be used to hold the cutting insert 100 by using a tool at the time of handling the cutting insert 100. The wrench groove 160 is concavely formed in the clamping surface 118. Therefore, it is possible to fit a wrench tool into the wrench groove 160 and more easily rotate the cutting insert 100.

Meanwhile, a wrench groove 360 of the cutting insert 300 in the related art according to the Comparative Example is formed in a direction parallel to the central axis of the cutting insert 300 as illustrated in FIG. 8B.

In contrast, in the case of the cutting insert 100 according to the exemplary embodiment of the present disclosure, the wrench groove 160 is formed to be inclined in a direction identical to a direction of a gradient of the lateral cutting edge 152 when viewed from a lateral side of the insert body 110.

Therefore, it is possible to prevent rigidity of the cutting insert 100 from deteriorating when the cutting insert 100 is reground and reused. This will be described in more detail.

In the Comparative Example, as illustrated in FIG. 8B, it can be seen that a first width h1 is formed from the wrench groove 360 to a lateral cutting edge 352 at the initial time before the grinding processing, but when the grinding processing is carried out along a regrinding reference line E, the width is decreased to a second width h2 from the wrench groove 360 to the lateral cutting edge 352. That is, the cutting insert 300 according to the Comparative Example has a problem in that rigidity of the cutting insert 300 deteriorates when the cutting insert 300 is reused through the regrinding processing.

In contrast, as illustrated in FIG. 8D, in the case of the cutting insert 100 according to the exemplary embodiment of the present disclosure, a third width h3 is formed from the wrench groove 160 to the lateral cutting edge 152 at the initial time before the grinding processing, but when the grinding processing is carried out along the regrinding reference line E, a fourth width h4 is formed from the wrench groove 160 to the lateral cutting edge 152, and a size difference between the third width h3 and the fourth width h4 has a very small value. Therefore, in the case of the cutting insert 100 according to the exemplary embodiment of the present disclosure, rigidity of the cutting insert 100 is maintained when the cutting insert 100 is reused through the regrinding processing.

On the other hand, the cutting insert 100 according to the exemplary embodiment of the present disclosure may provide a grinding reference surface. The grinding reference surface will be described with reference to FIGS. 2B, 2C, 2D, and 2E.

The grinding reference surface is provided as a curved surface grinding reference surface 114 and a flat surface grinding reference surface 116.

The curved surface grinding reference surface 114 is disposed at a lower side of the insert body 110, has a radius smaller than an outer diameter of the insert body 110, and is formed to be concentric with the first central axis cp.

Therefore, the grinding processing is carried out at the time of manufacturing the cutting insert 100, and the curved surface grinding reference surface 114 is used to be clamped by a grinding machine when the cutting insert is mounted on the grinding machine and the grinding processing is carried out.

The flat surface grinding reference surface 116 may be further formed on the curved surface grinding reference surface 114. The flat surface grinding reference surface 116 is used to manage a dimension of the cutting insert. The dimension management will be further described below. The cutting insert 100 performs the cutting processing in a state in which the cutting insert 100 is mounted on the holder 200, and the cutting processing needs to be carried out in accordance with a desired dimension value. In addition, a cutting condition such as a cutting angle and a cutting amount is set when the cutting processing is carried out. To appropriately set the condition, precision of a dimension of an external shape of the cutting insert 100 is required. To implement the dimension precision of the cutting insert 100, the grinding processing may be precisely carried out, and a reference surface is required to measure a dimension. Because the external shape of the cutting insert 100 includes curved surfaces and spiral shapes, a particular reference surface needs to be necessarily presented, and the flat surface grinding reference surface 116 is used as the reference surface.

Therefore, the cutting insert 100 according to the exemplary embodiment of the present disclosure provides the curved surface grinding reference surface 114 and the flat surface grinding reference surface 116, thereby more easily and precisely implementing the dimension management of the cutting insert 100.

On the other hand, in the case of the cutting insert 100 according to the exemplary embodiment of the present disclosure, the pressure receiving surface 140 may be provided to be inclined. This will be described with reference to the attached FIG. 5.

As illustrated in FIG. 5, the pressure receiving surface 140 is formed to be inclined when viewed from a lateral side of the cutting insert in a direction orthogonal to the pressure receiving surface 140 so that a portion of the pressure receiving surface 140, which is directed toward the tip cutting edge 150, is wider with respect to the first central axis cp. The pressure receiving surface 140 comes into direct contact with the pressing surface 264 of the twin finger 260 of the holder 200. When the indexable drill is withdrawn from the hole after machining the hole, the inclined surface of the pressure receiving surface 140 comes into contact with the pressing surface 264 in an inclined manner, and as a result, the inclined surface of the pressure receiving surface 140 serves to prevent the cutting insert 100 from being separated from the holder 200 even though coupling force is decreased between the holder 200 and the cutting insert 100.

Hereinafter, the holder 200 will be described in more detail with reference to FIGS. 1 and 9 to 12.

The holder 200 has a body flute 220 formed in an outer circumferential surface of a holder body 210, and the body flute 220 guides a discharge of cutting chips.

In addition, a seat 250 is formed at a tip portion of the holder body 210, and the cutting insert 100 is seated on the seat 250.

A center boss 240 is formed at a center of the seat 250, and the center boss 240 guides a rotation of the cutting insert 100 when the cutting insert 100 is mounted on the holder 200.

In addition, the twin fingers 260 in the form of two branches are formed on the seat 250. The holder fastening surface 262 having a curved surface is formed on an inner circumferential surface of the twin finger 260. In addition, the pressing surface 264 is formed at a lateral side of the twin finger 260 so as to press the cutting insert 100.

In addition, an oil hole 230 is formed in the holder body 210, and an end portion of the oil hole 230 may be positioned at any positions of the body flute 220. Cutting oil may be discharged through the oil hole 230, and the cutting oil being discharged is supplied onto a portion which is required to be cooled. For example, the cutting oil may be supplied onto the cutting insert 100 and portions which are subjected to the cutting processing.

On the other hand, the pressing surface 264 may be formed to be inclined when viewed from a lateral side of the holder body 210 in a direction orthogonal to the pressing surface 264 so that a portion of the pressing surface 264, which is directed toward the tip portion of the twin finger 260, is wider with respect to the third central axis cb.

As described above, when the cutting insert 100 is installed on the holder 200, the pressing surface 264 comes into close contact with the pressure receiving surface 140. Since the pressure receiving surface 140 and the pressing surface 264 are in direct contact with each other in an inclined manner, the cutting insert 100 may be withdrawn from a hole without being separated from the holder 200 when the indexable drill is withdrawn from the hole after machining the hole even though the cutting insert 100 is loosened in the holder 200.

Figure 9:
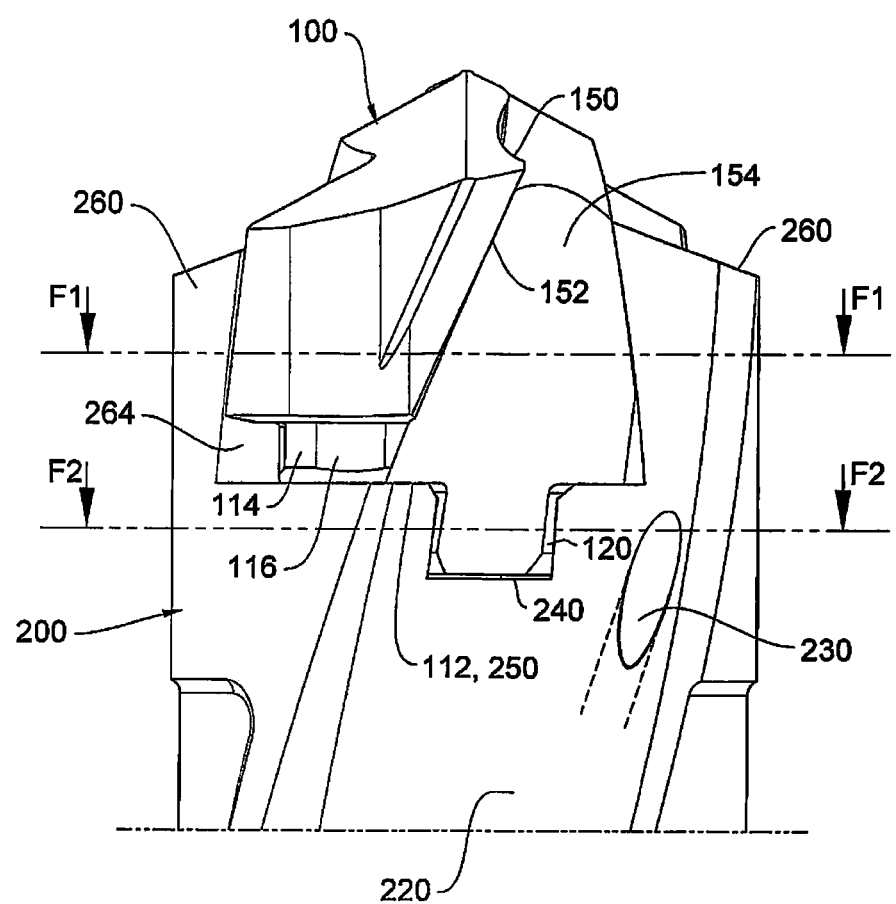
FIGS. 9 to 11 are views for explaining one example in a state in which the cutting insert according to the exemplary embodiment of the present disclosure is assembled to the indexable drill.
Figure 10:
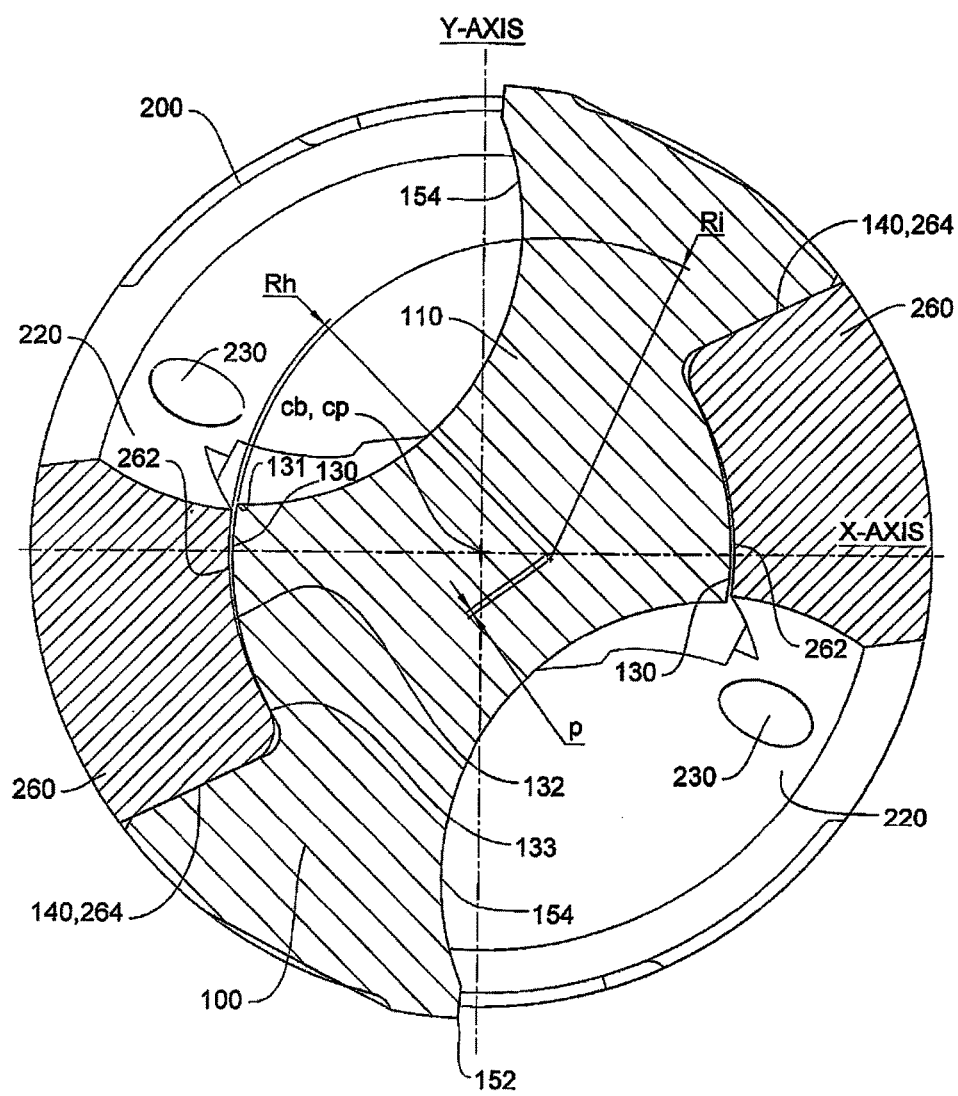
Figure 11:
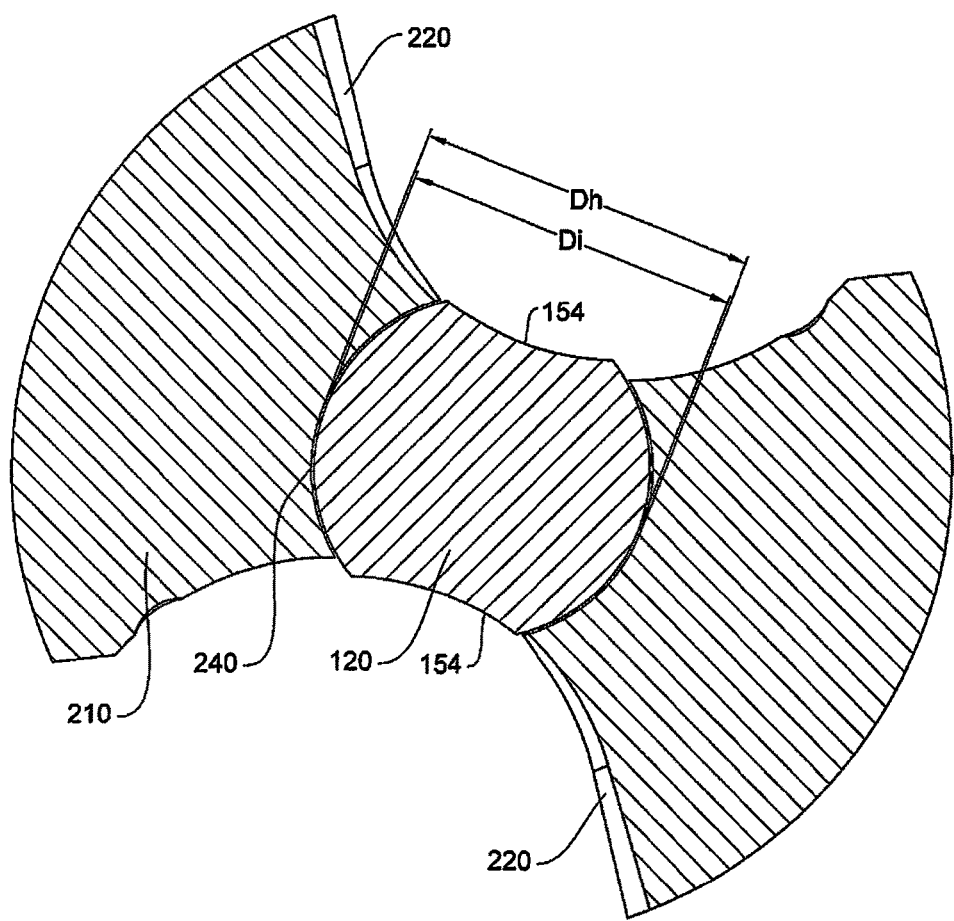

Hereinafter, an assembled state of the indexable drill will be described with reference to FIGS. 9 to 11. The attached FIGS. 9 to 11 are views for explaining one example in a state in which the cutting insert according to the exemplary embodiment of the present disclosure is assembled to the indexable drill. In more detail, FIG. 9 is a side view illustrating a state in which the cutting insert 100 is mounted on the holder 200. FIG. 10 is a cross-sectional view taken along line F1-F1 of FIG. 9, that is, a cross-sectional view for explaining an interaction between the fastening surface 130 and the body fastening surface 262. FIG. 11 is a cross-sectional view taken along line F2-F2 of FIG. 9, that is, a cross-sectional view for explaining a configuration between the post 120 and the center boss 240.

As illustrated in FIG. 9, the seating surface 112 is in close contact with the seat 250, and an end portion of the post 120 is spaced apart from a bottom of the center boss 240. In addition, the insert flute 154 and the body flute 220 cooperate with each other so as to implement continuity of a discharge of cutting chips.

FIG. 10 illustrates an exaggerated curvature radius compared to an actual curvature radius in order to describe an interaction between the fastening surface 130 and the body fastening surface 262 so that the interaction may be more easily understood.

A radius and a center of the curvature center cs of the fastening surface 130 is indicated by Ri, and a radius and a center of a curvature center of the body fastening surface 262 is indicated by Rh.

That is, the curvature center cs of the fastening surface 130 and the curvature center of the body fastening surface 262 may be spaced apart from each other by a deviation p.

In addition, the curvature center cs of the fastening surface 130 and the curvature center of the body fastening surface 262 are disposed at positions eccentric from the first central axis cp or the third central axis cb as illustrated in FIG. 10.

In addition, the curvature center cs of the fastening surface 130 may be positioned on the X-axis or deflected toward one side by a preset value. More specifically, the deflection value may be 0.05 mm or less. That is, in a case in which no deflection occurs, the deflection value becomes "zero (0)", and a deflection direction may be any direction. If a maximum deflection value is 0.05 mm or more, the fastening surface 130 and the body fastening surface 262 are fastened by excessive coupling force, and as a result, there is concern that the holder 200 will be deformed and a process of mounting the cutting insert 100 may be hindered, and thus the curvature center cs may be 0.05 mm or less in the X-axis.

Meanwhile, the cutting insert 100 is rotated about the first central axis cp.

Therefore, the initial portion 131 of the fastening surface 130 initially faces the body fastening surface 262 when the cutting insert 100 is rotated and mounted, and an interval is formed between the initial portion 131 and the body fastening surface 262, such that the fastening surface 130 may easily enter the inside of the body fastening surface 262.

As the cutting insert 100 rotates, the intermediate portion 132 gradually comes into close contact with the body fastening surface 262, and when the body fastening surface 262 completely enters up to the final portion 133, the body fastening surface 262 securely comes into close contact with the fastening surface 130, thereby implementing coupling force.

Meanwhile, when the holder 200 rotates counterclockwise based on FIG. 10 so that the indexable drill machines a hole, the pressing surface 264 transmits torque to the pressure receiving surface 140. Therefore, the cutting insert 100 rotates together with the holder 200.

On the other hand, in the case of the indexable drill according to the exemplary embodiment of the present disclosure, the post 120 of the cutting insert 100 is loosely assembled to the center boss 240 as illustrated in FIG. 11. That is, a diameter Di of the post 120 is smaller than a diameter Dh of the center boss 240. Therefore, when the cutting insert 100 is mounted on the holder 200, the cutting insert 100 may easily enter in the axial direction of the holder 200, and the cutting insert 100 is mounted on the holder 200 by being rotated clockwise, and the center boss 240 and the post 120 are loosely assembled, such that the cutting insert 100 may easily enter, and no resistance force is generated when the cutting insert 100 rotates. In addition, no resistance force is generated between the center boss 240 and the post 120 when the fastening surface 130 of the cutting insert 100 and the holder fastening surface 262 of the holder 200 are coupled.

Hereinafter, another exemplary embodiment of the holder of the indexable drill will be described with reference to FIG. 12.

Figure 12:
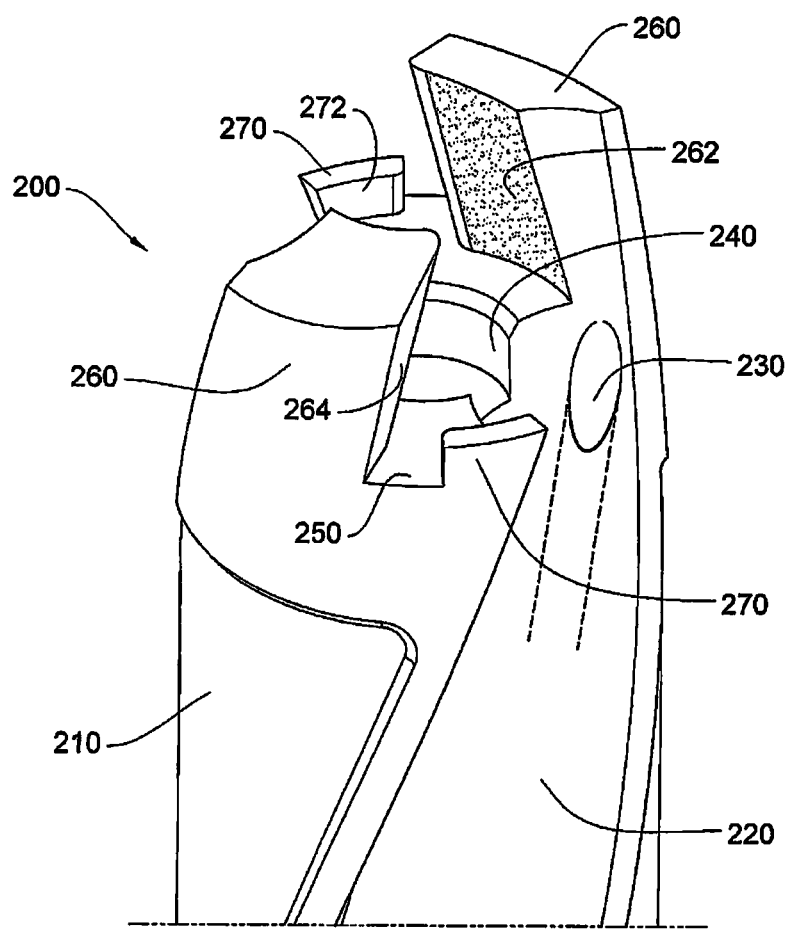
FIG. 12 is a view for explaining another example of a holder of the indexable drill according to the exemplary embodiment of the present disclosure.

The attached FIG. 12 is a view for explaining another example of a holder of the indexable drill according to the exemplary embodiment of the present disclosure.

As illustrated in FIG. 12, the holder 200 according to the exemplary embodiment of the present disclosure may further have a guide protrusion 270 formed on the seat 250. A guide surface 272 is formed on an inner circumferential surface of the guide protrusion 270, and the guide surface 272 guides the rotation of the cutting insert 100 when the cutting insert 100 is mounted on or separated from the holder body 210. Therefore, the cutting insert 100 may be mounted on the holder 200 while being aligned, and assembly precision between the holder 200 and the cutting insert 100 may be further improved.

The exemplary embodiment of the present disclosure has been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and is not limited, and the scope of the present disclosure shall be represented by the claims to be described below, and it should be construed that all of the changes or modified forms induced from the meaning and the scope of the claims, and an equivalent concept thereto are included in the scope of the present disclosure.

INDUSTRIAL APPLICABILITY

The cutting insert and the indexable drill according to the present disclosure may be used to machine a hole in a workpiece.

The invention claimed is:

1. A cutting insert comprising:
an insert body;
a post which is convexly formed at a lower side of the insert body and has a first central axis;
a fastening surface which is formed at a lateral side of the insert body;
a pressure receiving surface which is formed on the insert body in a direction orthogonal to the fastening surface;
a tip cutting edge which is formed at a tip portion of the insert body and subjected to cutting processing;
a lateral cutting edge which is formed at a lateral side of the insert body and subjected to cutting processing; and
an insert flute which is formed at one side of the lateral cutting edge of the insert body and guides a discharge of cutting chips,
wherein the fastening surface is provided as a surface of a cylindrical shape in which an upper radius and a lower radius are equal to each other, and a second central axis of the cylinder has a gradient with respect to the first central axis when viewed from a lateral side, and the second central axis is eccentric and has a gradient when viewed from a top side, and
wherein the pressure receiving surface is formed to be inclined so that a portion, which is directed toward the tip cutting edge, is wider with respect to the first central axis when viewed from a lateral side of the cutting insert in a direction orthogonal to the pressure receiving surface.

2. The cutting insert of claim 1, wherein in the fastening surface, when a first angle which is formed between the first central axis and a surface of the fastening surface is defined in a cross section that runs through the first central axis and an initial portion of the fastening surface, and a second angle which is formed between the first central axis and a surface of the fastening surface is defined in a cross section that runs through the first central axis and a final portion of the fastening surface, the first angle is greater than the second angle.

3. The cutting insert of claim 2, wherein in the fastening surface, when a third angle which is formed between the first central axis and a surface of the fastening surface is defined in a first cross section that runs through the first central axis and an initial portion of the fastening surface and a fourth angle which is formed between the first central axis and a surface of the fastening surface is defined in a cross section that is in parallel with the first cross section and runs through a final portion of the fastening surface, the third angle and the fourth angle are equal to each other.

4. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 3.

5. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 2.

6. The cutting insert of claim 1, wherein in the fastening surface, when a reference line is presented at a particular height, and a first distance along the reference line from a surface of an initial portion of the fastening surface to the first central axis, and a second distance along the reference line from a surface of a final portion of the fastening surface to the first central axis are defined, the first distance is smaller than the second distance.

7. The cutting insert of claim 6, wherein in the fastening surface, third and fifth distances from the first central axis to an initial portion of the fastening surface are smaller than fourth and sixth distances from the first central axis to a final portion of the fastening surface when viewed from a plan cross section that runs through the fastening surface,
wherein the third distance represents a shortest distance from the first central axis to a surface of the initial portion in a plan cross section of a portion adjacent to the tip portion,
the fourth distance represents a shortest distance from the first central axis to the surface of the initial portion in a plan cross section of a portion adjacent to a seating surface of the cutting insert,
fifth distance represents a shortest distance from the first central axis to the surface of the final portion in the plan cross section of a portion adjacent to the tip portion, and
the sixth distance represents a shortest distance from the first central axis to the surface of the final portion in the plan cross-section of a portion adjacent to the seating surface.

8. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 7.

9. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 6.

10. The cutting insert of claim 1, wherein a wrench groove into which a wrench tool is mounted is further formed at a lateral side of the insert body, and the wrench groove is formed to be inclined in a direction identical to a direction of a gradient of the lateral cutting edge when viewed from a lateral side of the insert body.

11. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 10.

12. The cutting insert of claim 1, wherein a curved surface grinding reference surface, which has a radius smaller than an outer diameter of the insert body and is concentric with the first central axis, is formed at a lower side of the insert body, and the curved surface grinding reference surface is clamped by a grinding machine when the cutting insert is mounted on the grinding machine and subjected to grinding processing.

13. The cutting insert of claim 12, wherein a flat surface grinding reference surface having a flat shape is further formed on the curved surface grinding reference surface, and the flat surface grinding reference surface is used to manage a dimension of the cutting insert.

14. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 12.

15. An indexable drill comprising:
a holder body;
a body flute which is formed in an outer circumferential surface of the holder body and guides a discharge of cutting chips;
a seat which is formed at a tip portion of the holder body and on which a cutting insert is placed;
a center boss which is formed on the seat and guides the rotation of the cutting insert when the cutting insert is mounted; and
twin fingers which are formed on the seats in the form of two branches, have a holder fastening surface that is formed on an inner circumferential surface thereof so as to be concentric with a third central axis of the center boss, and have a pressing surface that is formed at a lateral side so as to press the cutting insert, and
the cutting insert is the cutting insert according to claim 1.

16. The cutting insert of claim 15, further comprising:
an oil hole which is formed in the holder body, and allows cutting oil to be discharged to the cutting insert and a portion which is subjected to the cutting processing.

17. The cutting insert of claim 15, wherein the pressing surface is formed to be inclined when viewed from a lateral side of the holder body in a direction orthogonal to the pressing surface so that a portion of the pressing surface, which is directed toward a tip portion of the twin finger, is wider with respect to the third central axis.

18. The cutting insert of claim 15, wherein a post of the cutting insert is loosely assembled to the center boss.

19. The cutting insert of claim 15, wherein a guide protrusion is further formed on the seat so as to guide the rotation of the cutting insert when the cutting insert is mounted on or separated from the holder body.

* * * * *